(12) United States Patent
Ikawa

(10) Patent No.: US 6,835,346 B1
(45) Date of Patent: Dec. 28, 2004

(54) METHOD AND APPARATUS FOR PROCESSING A LINEAR GROOVE TO AN AIR BAG PORTION OF A SKIN FOR A VEHICLE

(75) Inventor: Mikihiro Ikawa, Osaka (JP)

(73) Assignee: Pearl Kogyo Co., Ltd., Osaka (JP)

( * ) Notice: Subject to any disclaimer, the term of this patent is extended or adjusted under 35 U.S.C. 154(b) by 433 days.

(21) Appl. No.: 09/868,911
(22) PCT Filed: Nov. 13, 2000
(86) PCT No.: PCT/JP00/07979
§ 371 (c)(1),
(2), (4) Date: Jul. 11, 2001
(87) PCT Pub. No.: WO01/36179
PCT Pub. Date: May 25, 2001

(30) Foreign Application Priority Data

Nov. 17, 1999 (JP) .......................................... 11-326696

(51) Int. Cl.[7] .............................. B29C 59/02; B06B 1/00
(52) U.S. Cl. .................... 264/442; 156/73.1; 425/174.2; 425/291
(58) Field of Search ................................ 264/442, 443, 264/444, 445; 156/73.1; 425/174.2, 291

(56) References Cited

U.S. PATENT DOCUMENTS 4,420,106 A * 12/1983 Hyatt ............................. 225/2
4,781,296 A * 11/1988 Morris et al. ................ 383/205
5,061,331 A * 10/1991 Gute ............................. 156/64
5,202,065 A * 4/1993 Lenander et al. ............ 264/442

FOREIGN PATENT DOCUMENTS

| JP | 52-971 | 1/1977 |
| JP | 4-355118 | 12/1992 |
| JP | 6-218811 | 8/1994 |
| JP | 8-282420 | 10/1996 |
| JP | 9-207223 | 8/1997 |
| JP | 2000-351355 | 12/2000 |

OTHER PUBLICATIONS

Method to create hidden tear seams in hidden airbag deployment ddors using ultrasonic activation of knife to ause localized heating an dmelting of cover material as it is being cut by blade, Derwent Abstract, Jun. 10, 1999.*

* cited by examiner

Primary Examiner—Stefan Staicovici
(74) Attorney, Agent, or Firm—Bacon & Thomas

(57) ABSTRACT

In the invention, an oscillating horn of an ultrasonic processing apparatus is moved along a planned process line and along the side of a rear face of a resin skin which is fixedly held so that the front face is closely in contact with a flat face of a surface table, whereby a resin for the skin is sequentially fused by ultrasonic vibration, and a fused resin is removed to sides to process a linear groove. Therefore, the linear groove having a reproducible constant breakage resistance can be efficiently processed on the side of the rear face of the skin, without applying any damage to a design face, and with reduced power consumption and simple control.

12 Claims, 3 Drawing Sheets

METHOD AND APPARATUS FOR PROCESSING A LINEAR GROOVE TO AN AIR BAG PORTION OF A SKIN FOR A VEHICLE

CROSS REFERENCE TO RELATED APPLICATION

This application is co-pending with and commonly assigned application No. 09/868,912, filed Jul. 11, 2001.

TECHNICAL FIELD

The present invention relates to a method and apparatus for processing a linear groove, in order to ensure the safety of passengers upon collision of a vehicle, allowing an air bag portion of a skin made of a resin such as polyvinyl chloride (PVC), polyolefine (TPO), polyurethane (TPU) which forms, for example, an instrument panel of the vehicle to break so as to inflate and deploy an air bag when a destructive force of a predetermined or higher level is applied to the air bag portion upon a collision or the like.

BACKGROUND ART

From the viewpoint of design, a linear groove which is to be processed in an air bag portion of a resin skin for a vehicle is requested to be processed not on the side of the front face of the skin but on the side of the rear face. Since the linear groove closely relates to the safety of passengers, it is required that the linear groove should be processed so as to exert a constant breakage resistance which is reproducible. In order to satisfy the request and the requirement, in recent years, means for processing a linear groove from the back-face side of a skin with leaving a predetermined thickness on the front-face side of the skin is generally adopted.

As means for processing a linear groove from the back-face side of a skin, conventionally, known are means such as (a) means for processing a linear groove by mechanically cutting away a resin material with a knife-like cutter or the like, and (b) means for processing a linear groove by irradiating a portion to be processed of the skin with a laser beam to locally burn and remove a resin material of the portion, as disclosed in, for example, Japanese Patent Application Laying-Open No. 10-85966.

In the case of the mechanical processing means (a), however, it is technically very difficult to perform the cutting without exposing a linear processing trace to the front-face side of the skin which is to be a design face, even if the cutting is performed from the back-face side of the skin. Therefore, the design face receives large damage. In such a type of processed product, in terms of quality control, it is important to measure the residual thickness on the front-face side of the skin after the processing of the linear groove, and to record and store the data for respective processed products. In the case of the mechanical processing means, the groove width is narrow, and the groove width be comes narrower because opposite faces on both sides of the groove come into close contact with each other due to an elastic force of the resin material immediately after the cutting. For this reason, it is difficult to accurately measure the residual thickness. This is not preferable in terms of quality control.

By contrast, in the case of the laser processing means (b), it is possible to process a predetermined linear groove without applying any damage to the design face (the front face of the skin), but a large output power is required. Thus, the power consumption is high and the processing cost is increased. Particularly, in order to process a wide groove in which the residual thickness that is important in terms of quality control can be accurately measured and easily recorded, it is necessary to use a laser beam generator having an extensive output power, or to cause a laser beam generator having a relatively small output power to trace along a planned process line a plurality of times. This results in a drawback that the processing cost is further increased.

In addition, in order to process a linear groove having a reproducible constant breakage resistance while a predetermined thickness is left on the front-face side of the skin by the laser processing means, it is necessary to delicately control the burned and removed amount of the resin material, i.e., the process depth of the groove in accordance with the variation in thickness of the skin. As means for this purpose, there is no means other than the control of the output power of the laser beam generator. The control in accordance with the variation in thickness of the skin requires sophisticated technology.

Moreover, in the case of the laser processing, the resin material of a skin portion corresponding to a linear groove to be processed is burned and removed. In the process, therefore, soot of an amount corresponding to the burned resin material is generated, and then emitted to the surroundings. If the emitted soot enters the processed groove, the soot causes measured values of the residual thickness to be dispersed. In order to avoid this disadvantage, it is necessary to suppress the generation of soot while an inert gas is used together, and to additionally dispose an apparatus for positively attracting the generated soot and for removing the soot from the processed portion. Thus, there arises a problem in that the cost of installation for the whole processing apparatus is very expensive.

SUMMARY OF THE INVENTION

The present invention was developed in view of the circumstances described above. It is an object of the present invention to provide a method and apparatus for processing a linear groove to an air bag portion of a skin for a vehicle in which a linear groove having a reproducible constant breakage resistance with a predetermined residual thickness on a front-face side of the skin can be efficiently processed into an advantageous condition for measuring the residual thickness, while avoiding damage to a design face, and with reduced power consumption and simple control.

The method of processing a linear groove to an air bag portion of a skin for a vehicle according to the invention is a method of processing a linear groove to an air bag portion of a resin skin for a vehicle from a side of a rear face of the skin in a condition where a predetermined thickness is left on a side of a front face thereof, characterized in that, in a condition where the skin is fixedly held so that the front face is closely in contact with a flat face, a position of an oscillating horn of an ultrasonic processing apparatus disposed on the side of the rear face of the skin is adjusted to make a clearance between a front end of the oscillating horn and the flat face coincident with the predetermined residual thickness on the side of the front face of the skin, the ultrasonic processing apparatus and the flat face for fixing the skin are thereafter relatively moved in a direction of a linear groove to be processed, and ultrasonic vibration is sequentially applied to the side of the rear face of the air bag portion of the skin, thereby sequentially fusing and removing a resin for the skin of a portion to which the ultrasonic sonic vibration is applied, to process the linear groove.

The apparatus for processing a linear groove to an air bag portion of a skin for a vehicle according to the invention is an apparatus for processing a linear groove to an air bag portion of a resin skin for a vehicle from a side of a rear face of the skin in a condition where a predetermined thickness is left on a side of a front face thereof, characterized in that the apparatus comprises: a surface table which fixedly holds the skin so that the front face thereof is closely in contact with a flat face; an ultrasonic processing apparatus which is disposed on the side of the rear face of the skin, and which applies ultrasonic vibration to a resin for the skin; a processing position adjusting mechanism which adjusts a position of an oscillating horn of the ultrasonic processing apparatus, to make a clearance between a front end of the oscillating horn and the flat face of the surface table coincident with the predetermined residual thickness on the side of the front face of the skin; and a processing position moving mechanism which relatively moves the ultrasonic processing apparatus and the surface table in a direction of a linear groove to be processed.

According to the invention with the above-mentioned configuration requirements, as means for processing a linear groove from a back-face side of the resin skin, ultrasonic vibration by the ultrasonic processing apparatus is utilized. The position of the front end of the oscillating horn is adjusted in the thickness direction of the skin, so that the clearance between the horn end and the flat face with which the front face of the skin is closely in contact coincides with the predetermined thickness to be left on the front-face side of the skin. In this condition, the ultrasonic processing apparatus and the flat face for fixing the skin are relatively moved (traced) once in the direction of a linear groove to be processed, i.e., along a planned process line. Simply by the above, the resin for the skin in the traced portion can be fused and removed, so as to process a wide linear groove having a predetermined depth. The fused resin caused by the ultrasonic processing is removed to sides of the groove, and hardened. Thus, any foreign material cannot enter the groove. Therefore, a linear processing trace which appears in the case of the mechanical processing is not exposed to the front-face side, so that damages to the design face can be avoided. In addition, the processing position corresponding to the variation in thickness of the skin can be easily adjusted by a simple mechanical control. Consequently, a linear groove having a predetermined residual thickness on the front-face side of the skin and having a reproducible constant breakage resistance can be efficiently processed. Moreover, the fused resin caused by the ultrasonic processing is removed to the sides of the groove and hardened, so that the fused resin will not enter the groove. Unlike the laser processing, therefore, it is entirely unnecessary to provide means for suppressing the generation of soot due to the groove processing, and means for attracting the generated soot and removing the soot to a place distant from the processed portion. While the processing cost can be remarkably reduced by the reduction of the installation cost for the whole of the apparatus and the reduction of the power consumption, the residual thickness on the front-face side of the skin after the groove processing can be easily and accurately measured from the back-face side. As a result, the invention attains an effect that the quality control in which data for respective processed products are recorded and stored can be appropriately and accurately performed.

In the method and apparatus for processing a linear groove to an air bag portion of a skin for a vehicle as described above, a configuration may be employed in which cooling air is blown to a skin portion immediately after the linear groove is processed by ultrasonic vibration, to cool and harden the fused resin. According to the configuration, the processing efficiency is improved, and the resin portion which is fused by the ultrasonic vibration and removed to the sides of the groove can be immediately hardened. Therefore, a foreign material which causes an error in measurement of the residual thickness is surely prevented from entering the processed groove, whereby the accuracy of the measurement of the residual thickness can be enhanced and the reliability of the quality control can be further increased.

In the method and apparatus for processing a linear groove to an air bag portion of a skin for a vehicle, a configuration may be employed in which a portion to be processed of the skin immediately before the application of the ultrasonic vibration is previously heated. According to this configuration, the portion to be processed is previously softened, and stress in the ultrasonic processing is dispersed, whereby damages to the design face on the front-face side can be further surely avoided. Moreover, the processing for a wider groove can be surely performed.

Alternatively, in the method and apparatus for processing a linear groove to an air bag portion of a skin for a vehicle, a configuration may be employed in which a portion to be processed of the skin immediately before the application of the ultrasonic vibration is previously heated, and cooling air is blown to the skin portion immediately after the processing of the linear groove, so as to cool and harden the fused resin. Therefore, the processing efficiency is improved, damages to the design face are avoided, and at the same time foreign materials are prevented from entering the groove, so that the reliability of the quality control can be further improved.

DESCRIPTION OF THE PREFERRED EMBODIMENT

Figure 1:
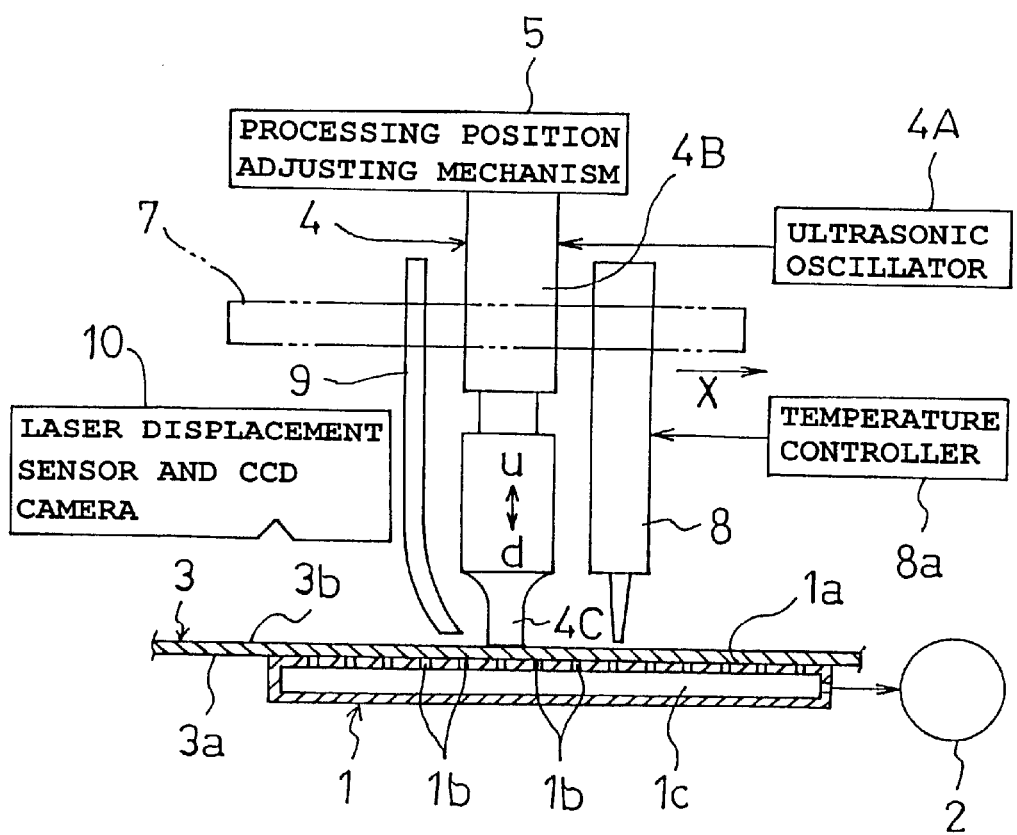
FIG. 1 is a schematic configuration diagram of the whole of a processing apparatus which is used in implementation of the method of processing a linear groove to an air bag portion of a skin for a vehicle according to the invention.
Figure 2:
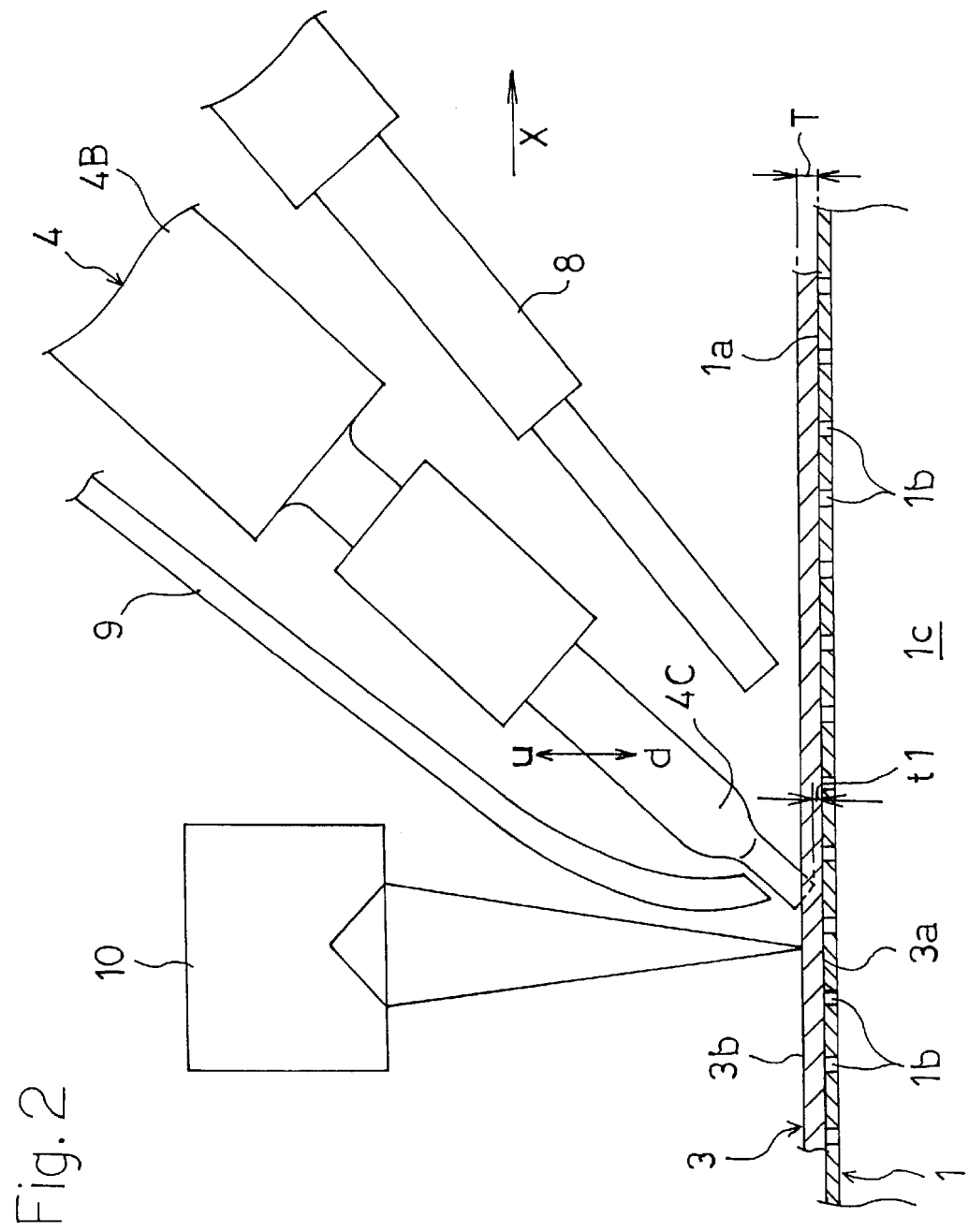
FIG. 2 is an enlarged side view of main portions of FIG. 1.

Hereinafter, an embodiment will be described. FIG. 1 is a schematic configuration diagram of the whole of a processing apparatus, and FIG. 2 is an enlarged side view of main portions thereof. In FIG. 1 and FIG. 2, a large number of small holes 1b . . . are formed in a flat upper face 1a of a surface table 1. The air in a cavity 1c of the surface table 1 is sucked by a vacuum generator 2 such as a vacuum pump, so as to reduce the pressure thereof, whereby an air bag portion of a resin skin 3 for a vehicle placed on the flat upper face 1a is attracted via the small holes 1b . . . . Therefore, the skin 3 can be fixedly held to the surface table 1 so that the front face 3a of the skin 3 is closely in contact with the flat upper face 1a.

An ultrasonic processing apparatus 4 for applying ultrasonic vibration to a resin for a skin is disposed above the surface table 1 on the side of the rear face 3b of the skin 3 which is fixedly held to the surface table 1. The ultrasonic processing apparatus 4 is configured by an ultrasonic oscillator 4A with an oscillating frequency of 20 to 40 KHz, an ultrasonic transducer 4B, and an oscillating horn 4C in which a cutting blade is integrally cut from an iron alloy and a titanium alloy. As the oscillating horn 4C of the ultrasonic processing apparatus 4, a plurality of types having different widths and shapes are prepared. The plurality of types of oscillating horns 4C are attached to the ultrasonic transducer 4B so as to be replaceable in an alternative way.

The ultrasonic transducer 4B and the oscillating horn 4C of the ultrasonic processing apparatus 4 are mounted on a processing position adjusting mechanism 5 which can move the position of the front end of the oscillating horn 4C in the thickness direction (the direction indicated by the arrow u-d) of the skin 3 so that a clearance t1 between the front end of the oscillating horn 4C and the flat upper face 1a of the surface table 1 coincides with a predetermined thickness t (see FIG. 3) which is to be left on the side of the front face 3a of the skin 3. When the thickness T of the skin 3 which is previously known or detected in processing is input, the processing position adjusting mechanism 5 moves and adjusts the position of the front end of the oscillating horn 4C to a position at a height that is obtained by subtracting the residual thickness t from the thickness T of the skin 3, setting the table flat face 1a as a reference face (zero). Specifically, the processing position adjusting mechanism 5 is a well-known mechanism in which an expanding and contracting apparatus such as a cylinder and a control section which calculates and outputs a required moving amount are combined with each other. Therefore, the description and illustration of the specific structure are omitted.

The ultrasonic processing apparatus 4 and the processing position adjusting mechanism 5 are mounted on a processing position moving mechanism 7 which is driven to be movable in a direction (in the direction indicated by the arrow X) of a linear groove 6 (see FIG. 3) that is to be processed on the side of the rear face 3b of the air bag portion of the skin 3, with respect to the surface table 1. As the processing position moving mechanism 7, a well-known conveyer, for example, a belt conveyer, or a chain conveyer can be employed. Thus, the description and illustration of the specific structure are omitted.

On the upper side of the processing position moving direction X of the ultrasonic processing apparatus 4, as a heating apparatus which previously heats a portion to be processed of the skin 3 immediately before the application of the ultraonic vibration, a hot-air generator 8 with a temperature controller 8a which blows hot air to the rear face 3b of the skin 3 is disposed. On the lower side of the processing position moving direction X of the ultrasonic processing apparatus 4, a cooling air ejecting apparatus 9 for blowing cooling air to the portion of the rear face 3b of the skin 3 immediately after the ultrasonic processing is disposed. In addition, directly behind the cooling air ejecting apparatus 9, for example, a laser displacement sensor and CCD camera 10 is disposed as an apparatus for measuring and recording the residual thickness t of the linear groove 6 processed in the rear face 3b of the skin 3 from the side of the rear face 3b of the skin. As a heating apparatus for previously heating the portion to be processed of the skin 3, instead of the hot-air generator 8, an electric heater or the like may be employed. As the apparatus for measuring and recording the residual thickness t, instead of the laser displacement sensor and CCD camera 10, a transmission-type photoelectric sensor may be employed. In addition, the hot-air generator 8, the cooling air ejecting apparatus 9, and the laser displacement sensor and CCD camera 10 are configured so that they are integrally moved in the processing position moving direction X together with the ultrasonic processing apparatus 4 via the processing position moving mechanism 7.

Next, a method of processing a linear groove 6 to an air bag portion of the skin 3 for a vehicle by using the processing apparatus with the above-described configuration will be described.

First, a portion to be processed (the air bag portion) of the resin skin 3 is placed on the flat upper face 1a of the surface table 1 with directing downward the front face 3a of the portion. By sucking the air in the cavity 1c and reducing the pressure by the vacuum generator 2, the portion to be processed of the resin skin 3 is attracted via the small holes 1b . . . , whereby the skin 3 is fixedly held to the surface table 1 so that the front face 3a is closely in contact with the flat upper face 1a.

Next, in accordance with the thickness T of the skin 3 to be processed, the ultrasonic transducer 4B and the oscillating horn 4C of the ultrasonic processing apparatus 4 are moved via the processing position adjusting mechanism 5 in the thickness direction of the skin 3 (the direction indicated by the arrow u-d), setting the flat upper face 1a of the surface table 1 as a reference face (zero) so that the clearance t1 between the front end of the oscillating horn 4C and the flat upper face 1a of the baseboard 1 coincides with the predetermined thickness t to be left on the side of the front face 3a of the skin 3. Thus, the processing position by the ultrasonic processing apparatus 4 is initially adjusted.

Thereafter, via the processing position moving mechanism 7, the ultrasonic processing apparatus 4 is integrally moved together with the hot-air generator 8, the cooling air ejecting apparatus 9, and the laser displacement sensor and CCD camera 10 in the processing position moving direction X. In accordance with the movement, the hot air generated by the hot-air generator 8 is blown to the rear face 3b of the skin 3, so that the portion to be processed of the skin 3 immediately before the ultrasonic processing is previously heated and softened. Then, ultrasonic vibration is applied to the softened portion via the oscillating horn 4C, so that the linear groove 6 in which the predetermined thickness t is left is processed on the side of the front face 3a of the skin 3. Accordingly, stress in the processing is dispersed, and damage to the design face on the side of the front face 3a of the skin 3 can be avoided.

Figure 3:
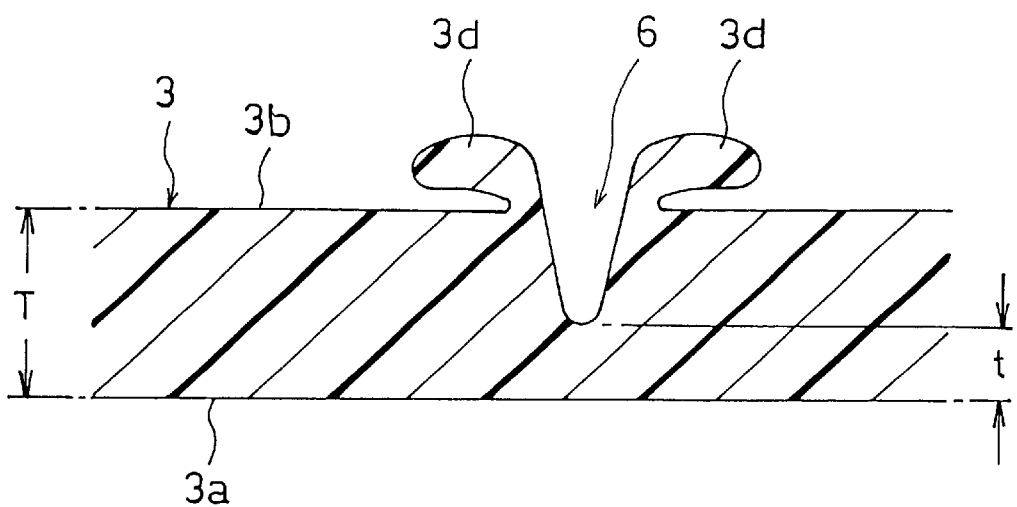
FIG. 3 is an enlarged vertical longitudinal section view of main portions and illustrating a processed linear groove and its periphery.

As shown in FIG. 3, a resin portion 3d which is sequentially fused with the ultrasonic processing by applying ultrasonic vibration is removed onto the rear face 3b of the skin on both sides of the processed linear groove 6. The resin portion 3d is immediately hardened in this position by the cooling air blown from the cooling air ejecting apparatus 9. Therefore, the fused resin portion 3d will not enter the processed linear groove 6, so that the linear groove 6 of a large width can be surely processed.

Immediately after the completion of the ultrasonic processing, the linear groove 6 after the processing is scanned by the laser displacement sensor and CCD camera 10 from the side of the rear face 3b of the skin 3. At the same time, the shot image is processed, so that the residual thickness t is measured and recorded for each processed product (skin). This is effectively used as the material for quality control of processed products.

In the above embodiment, the case where the processing position by the ultrasonic processing apparatus 4 is subjected to only the initial adjustment in accordance with the thickness T of the skin 3 has been described. Alternatively, in the case where a skin 3 in which the residual thickness t in the actual ultrasonic processing may vary by a degree larger than an allowable error with respect to a target value is to be processed, it is preferable that the position adjusting mechanism 5 is operated to perform a feedback adjustment so that the residual thickness t is always in an allowable error range. Herein, the position adjusting mechanism 5 mechanically operates, and hence such a feedback adjustment can be easily realized.

Industrial Applicability

As described above, the present invention provides the following technique. Position adjustment is performed so that a clearance between a front end of an oscillating horn of an ultrasonic processing apparatus disposed on the side of the rear face of a resin skin and a flat face on which the skin is placed coincides with a preset residual thickness on the side of the front face of the skin. The ultrasonic processing apparatus is then moved along a planned process line, and a resin for the skin is sequentially fused by ultrasonic vibration, and the fused resin is removed to the sides. While avoiding damage to a design face, and with reduced power consumption and a simple control, therefore, a linear groove in which a predetermined thickness is left, and which has a reproducible constant breakage resistance can be efficiently processed.

What is claimed is:

1. A method of processing a linear groove in an air bag portion of a resin skin for a vehicle, the resin skin having a front face and a rear face, the linear groove being processed in a side of the rear face of the resin skin in a condition where a predetermined thickness is left on a side of the front face thereof, the method utilizing an ultrasonic processing apparatus and comprising the steps of:

fixedly holding the front face closely in contact with a flat face;

adjusting the position of an oscillating horn of the ultrasonic processing apparatus disposed on the side of the rear face of the resin skin for forming a clearance between a front end of the oscillating horn and the flat face coincident with the predetermined residual thickness on the side of the front face of the skin;

relatively moving in a direction of the linear groove to be processed the ultrasonic processing apparatus;

sequentially applying ultrasonic vibration to the side of the rear face of the air bag portion of the resin skin, thereby sequentially fusing and removing a resin for the skin of a portion to which the ultrasonic vibration is applied, to process the linear groove, wherein cooling air is blown to a resin skin portion immediately after the linear groove is processed by the ultrasonic vibration, to cool and harden the fused resin portion which is removed to sides of the linear groove.

2. A method of processing a linear groove in an air bag portion of a resin skin for a vehicle according to claim 1, wherein a portion to be processed of the rear face of the resin skin immediately before the ultrasonic vibration is applied is previously heated and softened.

3. A method of processing a linear groove in an air bag portion of a resin skin for a vehicle according to claim 1, wherein a portion to be processed of the rear face of the resin skin immediately before the ultrasonic vibration is applied is previously heated and softened, and cooling air is blown to a resin skin portion immediately after the linear groove is processed by the ultrasonic vibration, to cool and harden the fused resin portion which is removed to sides of the linear groove.

4. An apparatus for processing a linear groove in an air bag portion in a resin skin for a vehicle, the resin skin having a front face and a rear face, the linear groove being processed in a side of the rear face of the resin skin in a condition where a predetermined thickness is left on a side of the front face thereof, the apparatus comprising:

a surface table which fixedly holds the resin skin so that the front face thereof is closely in contact with a flat face;

an ultrasonic processing apparatus which is disposed on the side of the rear face of the resin skin, and which applies ultrasonic vibration to the resin of the resin skin;

a processing position adjusting mechanism which adjusts a position of an oscillating horn of said ultrasonic processing apparatus, to form a clearance between a front end of said oscillating horn and said flat face of said surface table coincident with said predetermined residual thickness on the side of the front face of the resin skin; and a processing position moving mechanism which relatively moves said ultrasonic processing apparatus and said surface table in a direction of a linear groove to be processed wherein, on a lower side in a moving direction of said ultrasonic processing apparatus, a cooling air ejecting apparatus which blows cooling air to a resin skin portion immediately after ultrasonic processing to cool and harden a fused resin portion removed to sides of said linear groove, is disposed.

5. An apparatus for processing a linear groove to an air bag portion in a resin skin for a vehicle according to claim 4, wherein a large number of small holes are formed in a flat upper face of said surface table on which the resin skin for a vehicle is to be placed, and a vacuum generator for sucking air from a cavity of said surface table to reduce a pressure is connected to the flat upper face.

6. An apparatus for processing a linear groove to an air bag portion in a resin skin for a vehicle according to claim 4, wherein said ultrasonic processing apparatus is configured by an ultrasonic oscillator with an oscillating frequency of 20 to 40 KHz, an ultrasonic transducer, and an oscillating horn in which a cutting blade is cut, and said oscillating horn is exchangeably attached to said ultrasonic transducer.

7. An apparatus processing a linear groove to an air bag portion in a resin skin for a vehicle according to claim 4, wherein, on an upper side in a moving direction of said ultrasonic processing apparatus, a heating apparatus which previously heated and softened a portion to be processed in the rear face of said resin skin immediately before the application of ultrasonic vibration, is disposed.

8. An apparatus for processing a linear groove to an air bag portion in a resin skin for a vehicle according to claim 4, wherein, on an upper side in a moving direction of said ultrasonic processing apparatus, a heating apparatus which previously heated and softened a portion to be processed in the rear face of said resin skin immediately before the application of ultrasonic vibration, is disposed, and, on a lower side in the moving direction of said ultrasonic processing apparatus, a cooling air ejecting apparatus which blows cooling air onto a resin skin portion immediately after ultrasonic processing to cool and harden a fused resin portion removed to sides of said linear groove, is disposed.

9. An apparatus for processing a linear groove to an air bag portion in a resin skin for a vehicle according to claim 4, wherein, on a lower side in a moving direction of said ultrasonic processing apparatus, an apparatus which measures and records a residual thickness of a linear groove after the processing, is disposed.

10. An apparatus for processing a linear groove to an air bag portion in a resin skin for a vehicle according to claim 7, wherein, on a lower side in the moving direction of said ultrasonic processing apparatus, an apparatus which measures and records a residual thickness of a linear groove after the processing, is disposed.

11. An apparatus for processing a linear groove to an air bag portion in a resin skin for a vehicle according to claim 7, wherein, on a lower side in a moving direction of said cooling air ejecting apparatus, an apparatus which measures and records a residual thickness of a linear groove after the processing, is disposed.

12. An apparatus for processing a linear groove to an air bag portion in a resin skin for a vehicle according to claim 8, wherein, on a lower side in a moving direction of said cooling air ejecting apparatus, an apparatus which measures and records a residual thickness of a linear groove after the processing, is disposed.

* * * * *